(12) United States Patent  
Yaung

(10) Patent No.: US 6,998,207 B2
(45) Date of Patent: Feb. 14, 2006

(54) HIGH PERFORMANCE COLOR FILTER PROCESS FOR IMAGE SENSOR

(75) Inventor: Dun-Nian Yaung, Taipei (TW)

(73) Assignee: Taiwan Semiconductor Manufacturing Co., Ltd., Hsinchu (TW)

( * ) Notice: Subject to any disclaimer, the term of this patent is extended or adjusted under 35 U.S.C. 154(b) by 269 days.

(21) Appl. No.: 10/406,122

(22) Filed: Apr. 3, 2003

(65) Prior Publication Data

US 2004/0197681 A1 Oct. 7, 2004

(51) Int. Cl.
*G02B 5/20* (2006.01)
(52) U.S. Cl. .......................................... 430/7; 430/321
(58) Field of Classification Search .................... 430/7, 430/321; 257/432
See application file for complete search history.

(56) References Cited

U.S. PATENT DOCUMENTS

| | | | |
|---|---|---|---|
| 4,315,978 A | 2/1982 | Hartman | 430/4 |
| 5,719,074 A | 2/1998 | Hawkins et al. | 438/70 |
| 5,889,277 A | 3/1999 | Hawkins et al. | 250/208.1 |
| 6,285,065 B1 | 9/2001 | Levy | 257/440 |

FOREIGN PATENT DOCUMENTS

KR 2002-0052793 A * 7/2002

* cited by examiner

*Primary Examiner*—John A. McPherson
(74) *Attorney, Agent, or Firm*—Thomas, Kayden, Horstemeyer & Risley

(57) ABSTRACT

A method of fabricating a color filter image sensor, comprising the following sequential steps. A structure having a first color filter layer formed thereover is provided. The first color filter layer is patterned to form at least one first color filter layer portion. A second color filter layer is formed over the structure and the at least one patterned first color filter layer portion. The second color filter layer is patterned to form at least one second color filter layer portion. A third color filter layer is formed over the structure, the at least one patterned first color filter layer portion and the at least one second color filter layer portion. The at least one third color filter layer is etched back to form: at least one third color filter layer portion; a planar upper surface common to all of the at least one first, second and third color filter layer portions. A microlens layer is formed over the planar upper surface to form the color filter image sensor.

55 Claims, 2 Drawing Sheets

HIGH PERFORMANCE COLOR FILTER PROCESS FOR IMAGE SENSOR

FIELD OF THE INVENTION

The present invention relates generally to color filter fabrication and more specifically to methods of fabricating color filter image sensors.

BACKGROUND OF THE INVENTION

In single-chip color cameras, images captured by a single exposure are separated into several, non-overlapping, two-dimensional patterns encoded to component colors. Only one component color of the image is captured per pixel. Color filters must be patterned to cover individual pixels to permit suitable sampling of spatial color.

Recently, a photo-crosslinkable red-green-blue (RGB) Bayer color filter pattern is being widely used for solid-state sensor and display. As the pixel size decreases, color distortion caused by the misalignment of different color patterns becomes serious and the green pattern (photo-crosslinkable polymer) needs to be exposed twice. Additionally, the differences in thickness of the three spin-coated color (RGB) filters cause different photo-transmission rates and needs a polymer spin coat planarization layer for the following microlens ($\mu$-lens) process.

In the conventional color filter and $\mu$-lens process for pixel sizes smaller than about 4 $\mu$m, there are six (6) masking layers: blue, green-1, green-2, red, an overlying planarization layer to accommodate the difference thicknesses of the previous four color masking layers and the $\mu$-lens layer.

U.S. Pat. No. 6,258,065 B1 to Levy discloses a coplanar top surface of color filters using an etch back of the third color layer.

U.S. Pat. No. 5,899,277 to Hawkins et al. describes coplanar top and bottom surfaces of color filters.

U.S. Pat. No. 4,315,978 to Hartman describes uneven color filters.

U.S. Pat. No. 5,719,074 to Hawkins et al. describes a method of making a planar color filter array for CCDS from dyed and mordant layers.

SUMMARY OF THE INVENTION

Accordingly, it is an object of one or more embodiments of the present invention to provide an improved method of fabricating image sensors.

Other objects will appear hereinafter.

It has now been discovered that the above and other objects of the present invention may be accomplished in the following manner. Specifically, structure having a first color filter layer formed thereover is provided. The first color filter layer is patterned to form at least one first color filter layer portion. A second color filter layer is formed over the structure and the at least one patterned first color filter layer portion. The second color filter layer is patterned to form at least one second color filter layer portion. A third color filter layer is formed over the structure, the at least one patterned first color filter layer portion and the at least one second color filter layer portion. The at least one third color filter layer is etched back to form: at least one third color filter layer portion; a planar upper surface common to all of the at least one first, second and third color filter layer portions. A microlens layer is formed over the planar upper surface to form the color filter image sensor.

BRIEF DESCRIPTION OF THE DRAWINGS

The present invention will be more clearly understood from the following description taken in conjunction with the accompanying drawings in which like reference numerals designate similar or corresponding elements, regions and portions and in which.

DETAILED DESCRIPTION OF THE PREFERRED EMBODIMENT

Unless otherwise specified, all structures, layers, steps, methods, etc. may be formed or accomplished by conventional steps or methods known in the prior art.

In the present invention, only four (4) masking layers are needed: blue, red, green and the $\mu$-lens layer, or red, blue, green and the $\mu$-lens layer, as described in detail below.

Figure 1:
FIGS. 1 to 5 are cross-sectional views that schematically illustrate a preferred embodiment of the present invention.

Initial Structure—FIG. 1

For example, as shown in FIG. 1, a blue filter layer 12 is formed over structure 10, preferably by a spin coat process, and patterned to form blue filter layer portions 12', 12" each having a thickness of from about 5000 to 20,000 Å and more preferably from about 7000 to 12,000 Å. The blue filter layer 12 may be patterned using an overlying patterned photoresist layer.

Structure 10 may be a semiconductor substrate or a silicon semiconductor substrate and may include a transistor, a photodiode resistor, an interconnection, metal or a contact.

Blue filter layer portions 12', 12" are preferably comprised of polymer, blue organic pigment, resin, photopolymerizable material and/or solvent and are more preferably polymer (major material in final).

Figure 2:
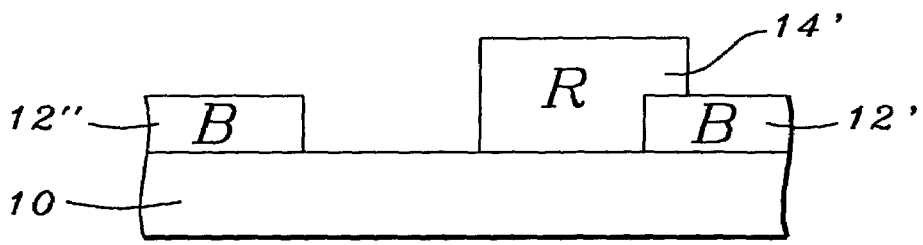

Formation of Red Filter Layer Portion(s) 14—FIG. 2

Then, as shown in FIG. 2, a red filter layer 14 is formed, preferably by a spin coat process, over the substrate 10 and the blue filter layer portions 12', 12" and is patterned to form red filter layer portion(s) 14' having a thickness of from about 7000 to 22,000 Å and more preferably from about 9000 to 14,000 Å. The red filter layer may be patterned using an overlying patterned photoresist layer.

As shown in FIG. 2 and in accordance with the method of the present invention, the masking of the red filter layer may permit overlapping of, for example, the adjacent blue filter layer portion 12' by the red filter layer portion 14'. This will minimize any gapping between adjacent red and blue filter layer portions 14', 12', for example, and any overlapping will be eliminated as discussed below.

Red filter layer portion(s) 14' is preferably comprised of polymer, red organic pigment, resin, photopolymerizable material and/or solvent and are more preferably polymer (major material in final).

Figure 3:
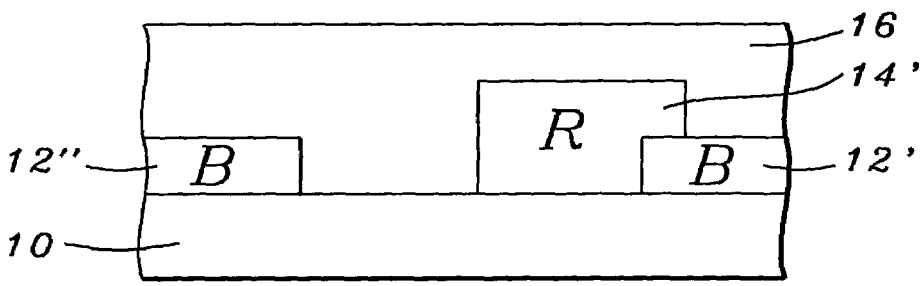

Formation of Green Filter Layer 16—FIG. 3

As shown in FIG. 3, a green filter layer 16 is formed, preferably by a spin coat process, over the structure 10, blue filter layer portions 12', 12" and red filter layer portion(s) 14' to a thickness of preferably from about 9000 to 24,000 Å and more preferably from about 11,000 to 16,000 Å.

Green filter layer 16 is preferably comprised of polymer, green organic pigment, resin, photopolymerizable material and/or solvent and are more preferably polymer (major material in final).

Figure 4:
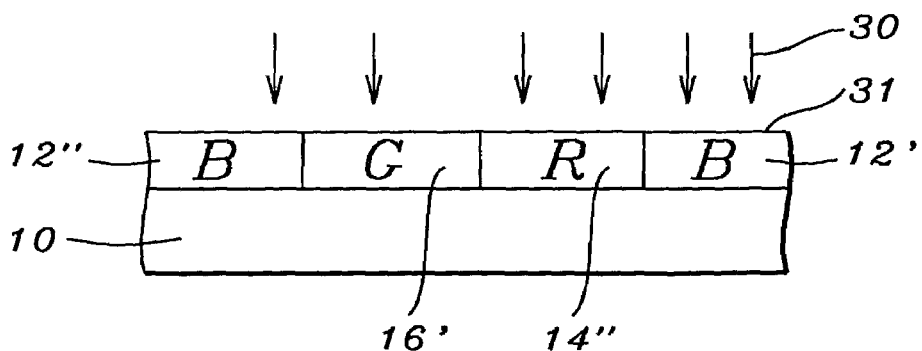

Etch Back of Green Filter Layer 16—FIG. 4

As shown in FIG. 4, green filter layer 16, red filter layer portion(s) 14' and preferably blue filter layer portions 12', 12" are etched back 30:

(1) to eliminate any overlap of:
   (a) the green filter layer 16 from over the red filter layer portion(s) 14' and the blue filter layer portions 12', 12"; and
   (b) any red filter layer portion(s) 14' from over any blue filter layer portion(s) 12'; and
(2) to form a green filter layer portion(s) 16' as shown in FIG. 4.

Etch back 30 forms planar blue, red and green filter layer portions 12', 12"; 14'; 16' all having the same thickness of preferably from about 5000 to 15,000 Å and more preferably from about 6000 to 10,000 Å.

Etch back 30 not only forms a common uniform, upper planar surface 31 for all the etched back blue, red and green filter layer portions 12', 12"; 14'; 16' but also eliminates any overlapping of different blue, red and green filter layer portions 12', 12"; 14'; 16' with each other.

Each etched back blue, red and green filter layer portions 12', 12"; 14'; 16' has a width of preferably from about 4 to 2000 $\mu$m and more preferably from about 200 to 15,000 $\mu$m depending upon pixel size (3 $\mu$m×3 $\mu$m to 100 $\mu$m×100 $\mu$m) and pixel array (~64 and up).

Reversal of Blue Filter Layer 12 and Red Filter Layer 14

It is noted that although the FIGS. show blue filter layer portions 12', 12" ("B") and a red filter layer portion 14' ("R"), the blue filter layer portions 12', 12" may instead be comprised of red filter material ("R") and the red filter layer portion 14' may instead be comprised of blue filter material ("B") in the above-described processing. It is also noted that the green filter layer 16 is preferably formed after the formation of the color filter layer portions 12', 12"; 14'.

Figure 5:
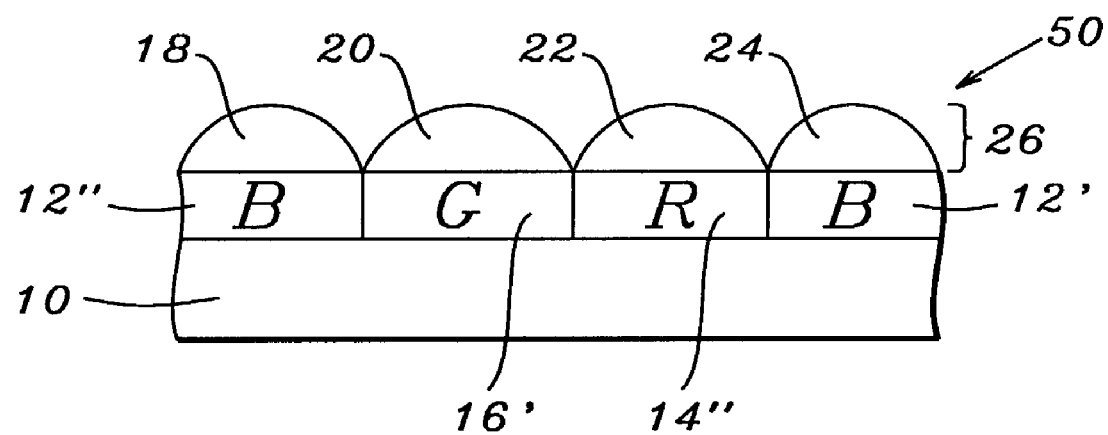

Formation if Microlens Layer 26—FIG. 5

As shown in FIG. 5, a microlens ($\mu$-lens) layer 26 is formed over the planar blue, red and green filter layer portions 12', 12"; 14'; 16' so that each planar blue, red and green filter layer portions 12', 12"; 14'; 16' has a respective $\mu$-lens 24, 18, 22, 20. This completes the fabrication of color filter image sensor 50.

As one skilled in the art understands, the method of the present invention may be used to fabricate other image sensors having differing sequencing of blue, red and green filter layer portions 12, 14, 16.

Advantages of the Present Invention

The advantages of one or more embodiments of the present invention include:
1. reduced cost by the use of fewer masking layers and masking steps;
2. color distortion is avoided that would otherwise be caused by misalignment of different color patterns;
3. a uniform thickness for differing color patterns is achieved; and
4. easier $\mu$-lens focus by reducing the total pixel thickness.

While particular embodiments of the present invention have been illustrated and described, it is not intended to limit the invention, except as defined by the following claims.

We claim:

1. A method of fabricating a color filter image sensor, comprising the sequential steps of:
   providing a structure;
   forming a first color filter layer over the structure;
   patterning the first color filter layer to form at least one patterned first color filter layer portion;
   forming a second color filter layer over the structure and the at least one patterned first color filter layer portion;
   patterning the second color filter layer to form at least one patterned second color filter layer portion partially overlapping the at least one patterned first color filter portion;
   forming a third color filter layer over the structure, the at least one patterned first color filter layer portion and the at least one patterned second color filter layer portion; and
   etching back at least the third color filter layer to form:
      at least one third color filter layer portion; and
      a planar upper surface common to all of the at least one first color, second color and third color filter layer portions; and
   forming a microlens layer over the common planar upper surface to form the color filter image sensor.

2. The method of claim 1, wherein the structure is a semiconductor substrate.

3. The method of claim 1, wherein the structure is a silicon semiconductor substrate.

4. The method of claim 1, wherein the first, second and third filter layers are formed by spin-coating processes.

5. The method of claim 1, wherein the etched-back at least one first, second and third filter layer portions form a continuous and contiguous filter layer.

6. The method of claim 1, wherein the first color filter layer has a thickness of from about 5000 to 20,000 Å; the second color filter layer has a thickness of from about 7000 to 22,000 Å and the third color filter layer has a thickness of from about 9000 to 24,000 Å.

7. The method of claim 1, wherein the first color filter layer has a thickness of from about 7000 to 12,000 Å; the second color filter layer has a thickness of from about 9000 to 14,000 Å and the third color filter layer has a thickness of from about 11,000 to 16,000 Å.

8. The method of claim 1, wherein the etched-back at least one first, second and third color filter layer portions each have a thickness of from about 5000 to 15,000 Å.

9. The method of claim 1, wherein the etched-back at least one first, second and third color filter layer portions each have a thickness of from about 6000 to 10,000 Å.

10. The method of claim 1, wherein the etched-back at least one first, second and third color filter layer portions each have a width of from about 4 to 20,000 $\mu$m.

11. The method of claim 1, wherein the etched-back at least one first, second and third color filter layer portions each have a width of from about 200 to 15,000 $\mu$m.

12. The method of claim 1, wherein the microlens layer comprises respective microlenses over the etched-back at least one first, second and third color filter layer portions.

13. The method of claim 1, wherein the first, second and third color filter layers are each comprised of polymer, respective first, second and third color organic pigments, resin, photopolymerizable material and/or solvent.

14. The method of claim 1, wherein the first, second and third color filter layers are each comprised of polymer.

15. The method of claim 1, wherein the etching back of the at least one first, second and third color filter layer portions eliminates any overlapping of different at least one first, second and third color filter layer portions.

16. The method of claim 1, wherein there are no gaps between adjacent the at least one first, second and third color filter layer portions.

17. The method of claim 1, wherein the first color is blue, the second color is red and the third color is green.

18. The method of claim 1, wherein the first color is red, the second color is blue and the third color is green.

19. The method of claim 1, wherein the third color is green.

20. A method of fabricating a color filter image sensor, comprising the sequential steps of:
provided a structure;
forming a first color filter layer over the structure;
patterning the first color filter layer to form at least one patterned first color filter layer portion;
forming a second color filter layer over the structure and the at least one patterned first color filter layer portion;
patterning the second color filter layer to form at least one patterned second color filter layer portion partially overlapping the at least one patterned first color filter portion;
forming a green filter layer over the structure, the at least one patterned first color filter layer portion and the at least one second color filter layer portion; and
etching back at least the green filter layer to form:
at least one green filter layer portion; and
a planar upper surface common to all of the at least one first color, second color and green filter layer portions; and
forming a microlens layer over the common planar upper surface to form the color filter image sensor.

21. The method of claim 20, wherein the structure is a semiconductor substrate.

22. The method of claim 20, wherein the structure is a silicon semiconductor substrate.

23. The method of claim 20, wherein the first color, second color and green filter layers are formed by spin-coating processes.

24. The method of claim 20, wherein the etched-back at least one first, second and green filter layer portions form a continuous and contiguous filter layer.

25. The method of claim 20, wherein the first filter layer has a thickness of from about 5000 to 20,000 Å; the second filter layer has a thickness of from about 7000 to 22,000 Å and the green filter layer has a thickness of from about 9000 to 24,000 Å.

26. The method of claim 20, wherein the first color filter layer has a thickness of from about 7000 to 12,000 Å; the second color filter layer has a thickness of from about 9000 to 14,000 Å and the green filter layer has a thickness of from about 11,000 to 16,000 Å.

27. The method of claim 20, wherein the etched-back at least one first color, second color and green filter layer portions each have a thickness of from about 5000 to 15,000 Å.

28. The method of claim 20, wherein the etched-back at least one first color, second color and green filter layer portions each have a thickness of from about 6000 to 10,000 Å.

29. The method of claim 20, wherein the etched-back at least one first color, second color and green filter layer portions each have a width of from about 4 to 20,000 µm.

30. The method of claim 20, wherein the etched-back at least one first color, second color and green filter layer portions each have a width of from about 200 to 15,000 µm.

31. The method of claim 20, wherein the microlens layer comprises respective microlenses over the etched-back at least one first color, second color and green filter layer portions.

32. The method of claim 20, wherein the first color, second color and green filter layers are each comprised of polymer, respective first color, second color and green organic pigments, resin, photopolymerizable material and/or solvent.

33. The method of claim 20, wherein the first color, second color and green filter layers are each comprised of polymer.

34. The method of claim 20, wherein the etching back of the at least one first color, second color and green filter layer portions eliminates any overlapping of different at least one first color, second color and green filter layer portions.

35. The method of claim 20, wherein there are no gaps between adjacent the at least one first color, second color and green filter layer portions.

36. The method of claim 20, wherein the first color is blue and the second color is red.

37. The method of claim 20, wherein the first color is red and the second color is blue.

38. A method of fabricating a color filter image sensor, comprising the sequential steps of:
providing a structure;
forming a first color filter layer over the structure;
patterning the first color filter layer to form at least one patterned first color filter layer portion;
forming a second color filter layer over the structure and the at least one patterned first color filter layer portion;
patterning the second color filter layer to form at least one patterned second color filter layer portion partially overlapping the at least one patterned first color filter portion;
forming a third color filter layer over the structure, the at least one patterned first color filter layer portion and the at least one second color filter layer portion; and
etching back at least the third color filter layer to form:
at least one third color filter layer portion; and
a planar upper surface common to all of the at least one first color, second color and third color filter layer portions;
wherein the etching back of the at least one first, second and third color filter layer portions eliminates any overlapping of different at least one first, second and third color filter layer portions; and
forming a microlens layer over the common planar upper surface to form the color filter image sensor.

39. The method of claim 38, wherein the structure is a semiconductor substrate.

40. The method of claim 38, wherein the structure is a silicon semiconductor substrate.

41. The method of claim 38, wherein the first, second and third filter layers are formed by spin-coating processes.

42. The method of claim 38, wherein the etched-back at least one first, second and third filter layer portions form a continuous and contiguous filter layer.

43. The method of claim 38, wherein the first color filter layer has a thickness of from about 5000 to 20,000 Å; the second color filter layer has a thickness of from about 7000 to 22,000 Å and the third color filter layer has a thickness of from about 9000 to 24,000 Å.

44. The method of claim 38, wherein the first color filter layer has a thickness of from about 7000 to 12,000 Å; the second color filter layer has a thickness of from about 9000 to 14,000 Å and the third color filter layer has a thickness of from about 11,000 to 16,000 Å.

45. The method of claim 38, wherein the etched-back at least one first, second and third color filter layer portions each have a thickness of from about 5000 to 15,000 Å.

46. The method of claim 38, wherein the etched-back at least one first, second and third color filter layer portions each have a thickness of from about 6000 to 10,000 Å.

47. The method of claim 38, wherein the etched-back at least one first, second and third color filter layer portions each have a width of from about 4 to 20,000 μm.

48. The method of claim 38, wherein the etched-back at least one first, second and third color filter layer portions each have a width of from about 200 to 15,000 μm.

49. The method of claim 38, wherein the microlens layer comprises respective microlenses over the etched-back at least one first, second and third color filter layer portions.

50. The method of claim 38, wherein the first, second and third color filter layers are each comprised of polymer, respective first, second and third color organic pigments, resin, photopolymerizable material and/or solvent.

51. The method of claim 38, wherein the first, second and third color filter layers are each comprised of polymer.

52. The method of claim 38, wherein there are no gaps between adjacent the at least one first, second and third color filter layer portions.

53. The method of claim 38, wherein the first color is blue, the second color is red and the third color is green.

54. The method of claim 38, wherein the first color is red, the second color is blue and the third color is green.

55. The method of claim 38, wherein the third color is green.

* * * * *